United States Patent [19]
Siponen

[11] Patent Number: 6,100,672
[45] Date of Patent: Aug. 8, 2000

[54] START UP CHARGING CONTROL

[75] Inventor: Sakari Siponen, Oulu, Finland

[73] Assignee: Nokia Mobile Phones Limited, Espoo, Finland

[21] Appl. No.: 09/372,439

[22] Filed: Aug. 11, 1999

[51] Int. Cl.⁷ .................................................. H01M 10/46
[52] U.S. Cl. .................................................. 320/150
[58] Field of Search ................................. 320/129, 132, 320/150, 152, 153, FOR 134, FOR 135

[56] References Cited

U.S. PATENT DOCUMENTS

| | | |
|---|---|---|
| 5,446,364 | 8/1995 | Naskali ........................... 320/2 |
| 5,625,274 | 4/1997 | Naskali ........................... 320/23 |
| 5,648,711 | 7/1997 | Hakkarainen ..................... 320/2 |
| 5,705,915 | 1/1998 | Douglas et al. . |
| 5,760,568 | 6/1998 | Naskali ........................... 320/5 |
| 5,821,735 | 10/1998 | Scharff ........................... 320/125 |

*Primary Examiner*—Edward H. Tso
*Attorney, Agent, or Firm*—Perman & Green, LLP

[57] ABSTRACT

A start up charger and a method of providing an initial charge for a significantly depleted battery of a cellular phone is described in which the temperature of the battery is sensed and compared to a predetermined limit and further the battery condition is sensed and compared to preset conditions. If the battery temperature exceeds the temperature limit or the battery does not meet the preset conditions, the charging cycle is disabled.

10 Claims, 4 Drawing Sheets

START UP CHARGING CONTROL

BACKGROUND OF THE INVENTION

With the proliferation of cellular phones, there has been pressure to improve the battery power capability to supply these devices. The efficacy of these phones relies on mobility and such mobility requires efficient battery power. From the start the batteries used have been rechargeable, prompting significant development in the structure of rechargeable batteries. Under normal conditions, the charging of such batteries is accomplished by circuitry built into the control microprocessor of the cellular phone. In order to operate, however, the controller requires a minimum voltage level from the batteries. A problem therefore arises when the battery charge is depleted below the voltage required to power the microprocessor control unit (MCU). Without the benefit of the MCU, the charger current can be applied to the battery even if damaged, partially disabled or at high temperature. This can result in damage to an otherwise useful battery or to the charging circuit.

In prior art systems, such damage is sought to be avoided by providing the low voltage start-up charging circuit with a timer. If the operational threshold of the MCU is not attained within a preset period, then the charging circuit is shut down. In addition some prior systems provide an overall voltage ceiling, which, if exceeded, will result in the shut down of the timer. Such systems to not take into consideration, the temperature of the battery at charger start-up nor the condition of battery.

It is a purpose of this invention to provide an improved charging system for depleted batteries in which modified circuitry is inserted into the energy management integrated circuit of the MCU to prevent charging when the battery is at excessive temperatures or non-functional.

SUMMARY OF THE INVENTION

In the system of this invention, components are added to the energy management module of the microprocessor control unit to sense the presence of the battery and its temperature. The sensed temperature is compared to a predetermined limit for the type of battery in use. The sensing components operate to shut down the energy management module, i.e., the charging circuit, when the temperature exceeds the predetermined limit or when a battery malfunction is indicated. This provides a method of control of the start-up cycle of the charging circuit which is responsive to temperature and the operational condition of the battery.

DESCRIPTION OF THE DRAWINGS

The invention is described in more detail below with reference to the attached drawing in which.

DESCRIPTION OF THE PREFERRED EMBODIMENT

Figure 1:
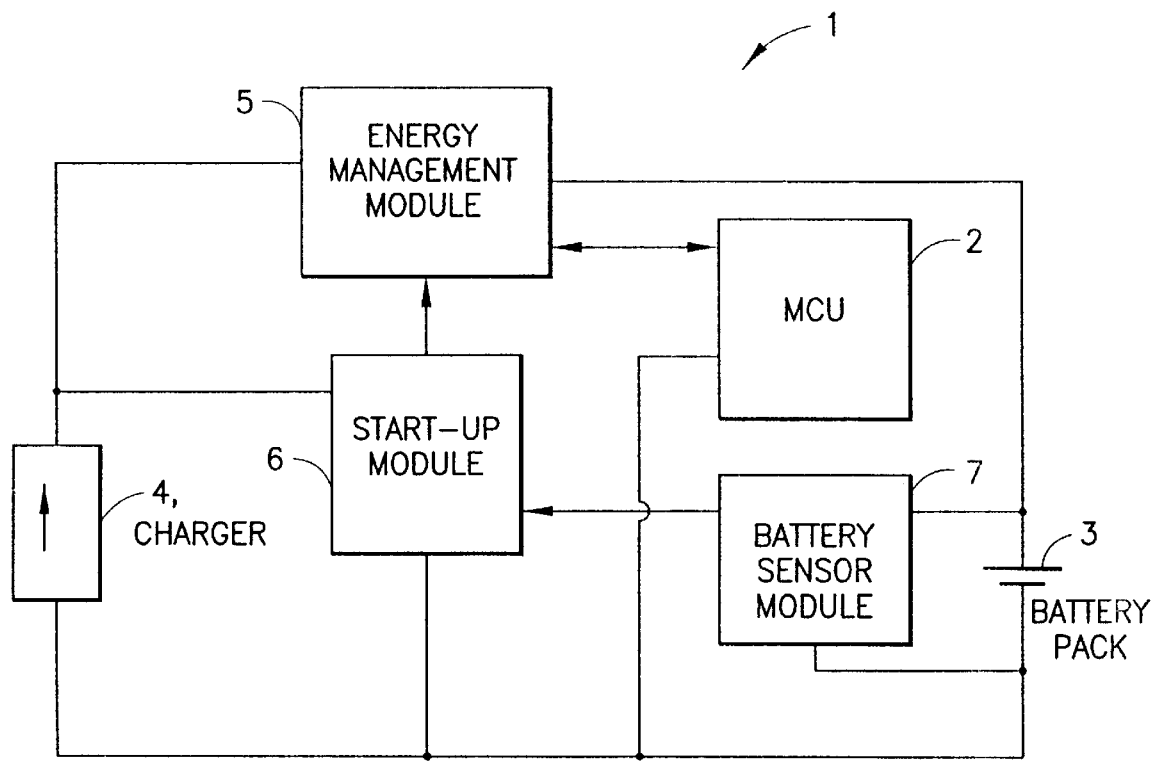
FIG. 1 is a schematic diagram of the charger control system of this invention.

The basic components of the system of this invention are illustrated in the schematic diagram of FIG. 1. The control circuit 1, for charging of a cellular phone, consists of a microprocessor controller 2 which is powered by a battery pack 3. A charger 4 is connected to provide a charging current to the battery pack 3 when the energy of the battery is depleted. The charger 4 is controlled by an energy management module 5 including a start-up module 6. A battery sensor module 7 is operatively associated with the battery pack 3 to sense the size, condition, and temperature of the battery pack 3.

Figure 2:
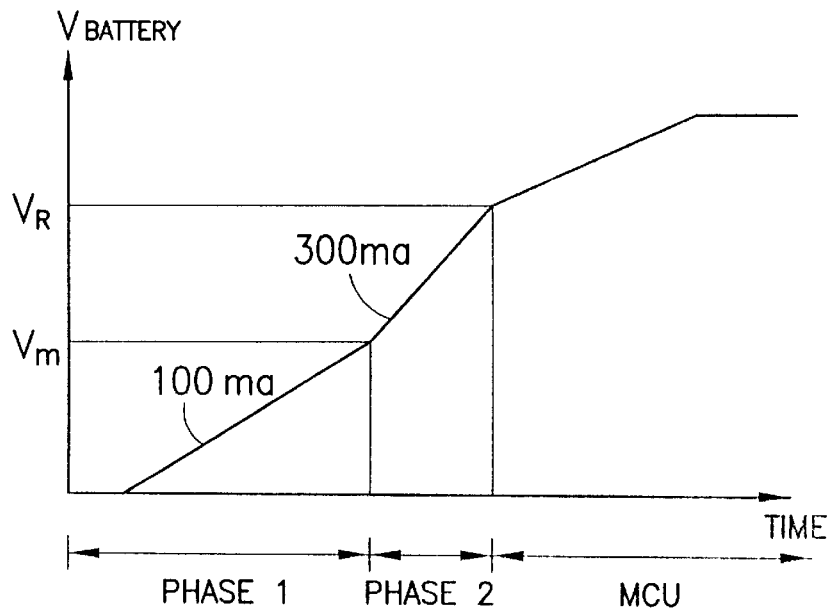
FIG. 2 is a graph of battery voltage over a normal operating cycle.
Figure 5:
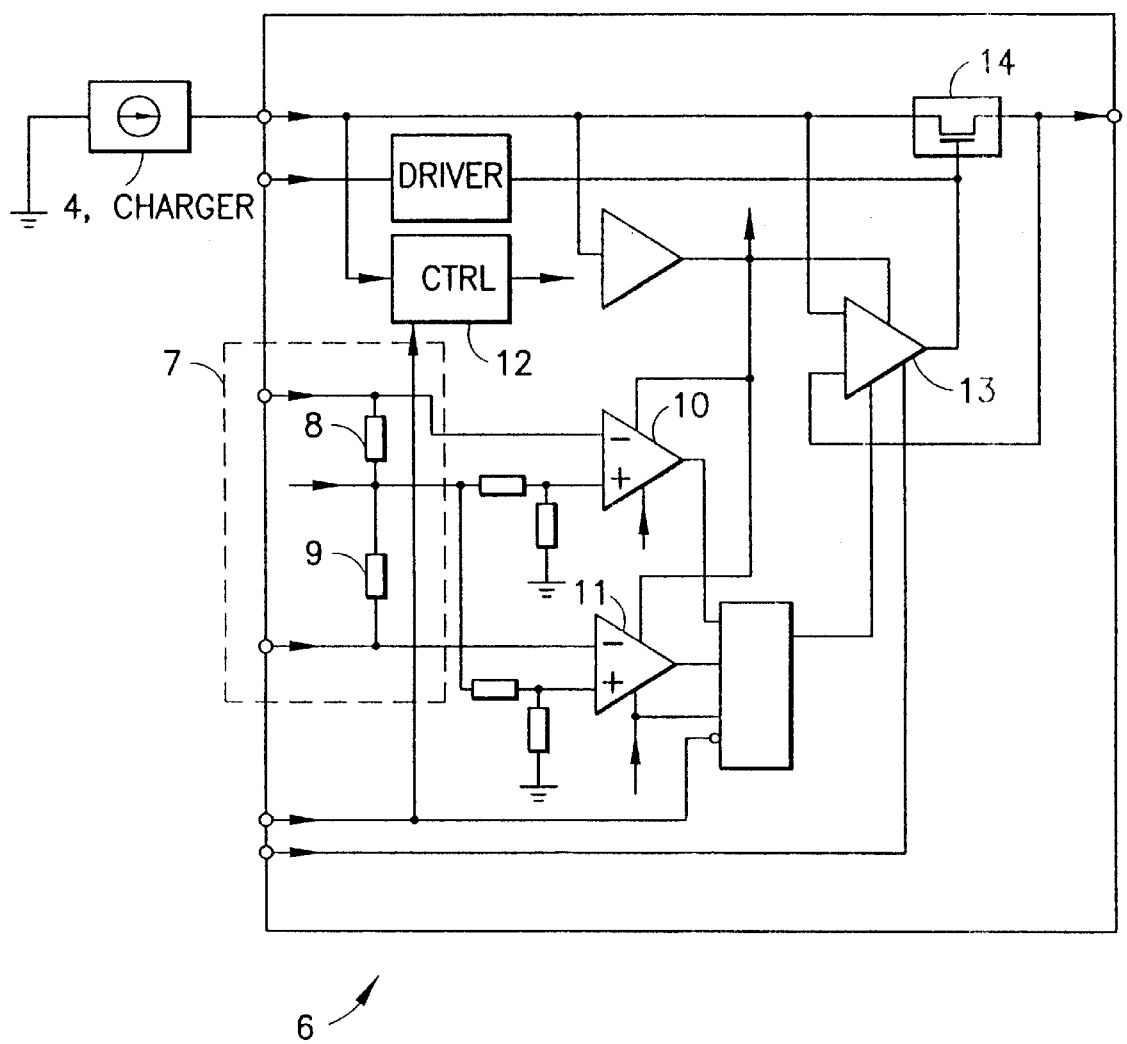
FIG. 5 is a schematic diagram of the start-up circuit of this invention.

Controller 2 will control the charger function under normal conditions as long as its threshold voltage ($V_R$) requirements are met by the battery pack 3. The steps of the normal charging cycle is shown in the graph of FIG. 2. A two step cycle is desirable to speed up the start-up function. As shown in FIG. 2, initially a 100 ma current is applied to the battery pack 3 by the start-up circuit of FIG. 5. After a short period a 300 ma current is applied once the start-up conditions are met.

An application specific integrated circuit (ASIC) 5 is constructed as part of controller 2 to provide the energy management functions relating to the charging cycle. The ASIC 5 is constructed to take control of the charging cycle, when the voltage of the battery pack 3 falls below the threshold voltage needed to operate the controller 2. To avoid excessive currents due to low battery levels, through the start-up module 6, ASIC 5 limits the available charging current in two steps. The first step provides a constant current to the battery of 100 ma until the battery voltage ($V_{BAT}$) reaches a predetermined level ($V_m$). At this point an increased charging current of 300 ma is provided. The 300 ma current is applied until a reset voltage ($V_R$) is reached. At this point normal charging occurs as dictated by the microprocessor control unit 2.

The start-up module 6 provides the unique functions of this invention in conjunction with the battery sensor module 7. Module 7 employs a negative temperature coefficient resistor (RNTC) to generate a signal relative to the operating temperature of the battery pack 3. This signal is provided to a comparator in the start-up module 6 which compares the signal to a preset level relative to a predetermined temperature limit $T_{MAX}$. In this manner an indication of the condition of the battery is obtained. A second resistor generates a signal relative to the presence of the battery. Depending on the relative voltage of the second resistor, a second comparator can determine if the battery pack 3 is connected.

Figure 4:
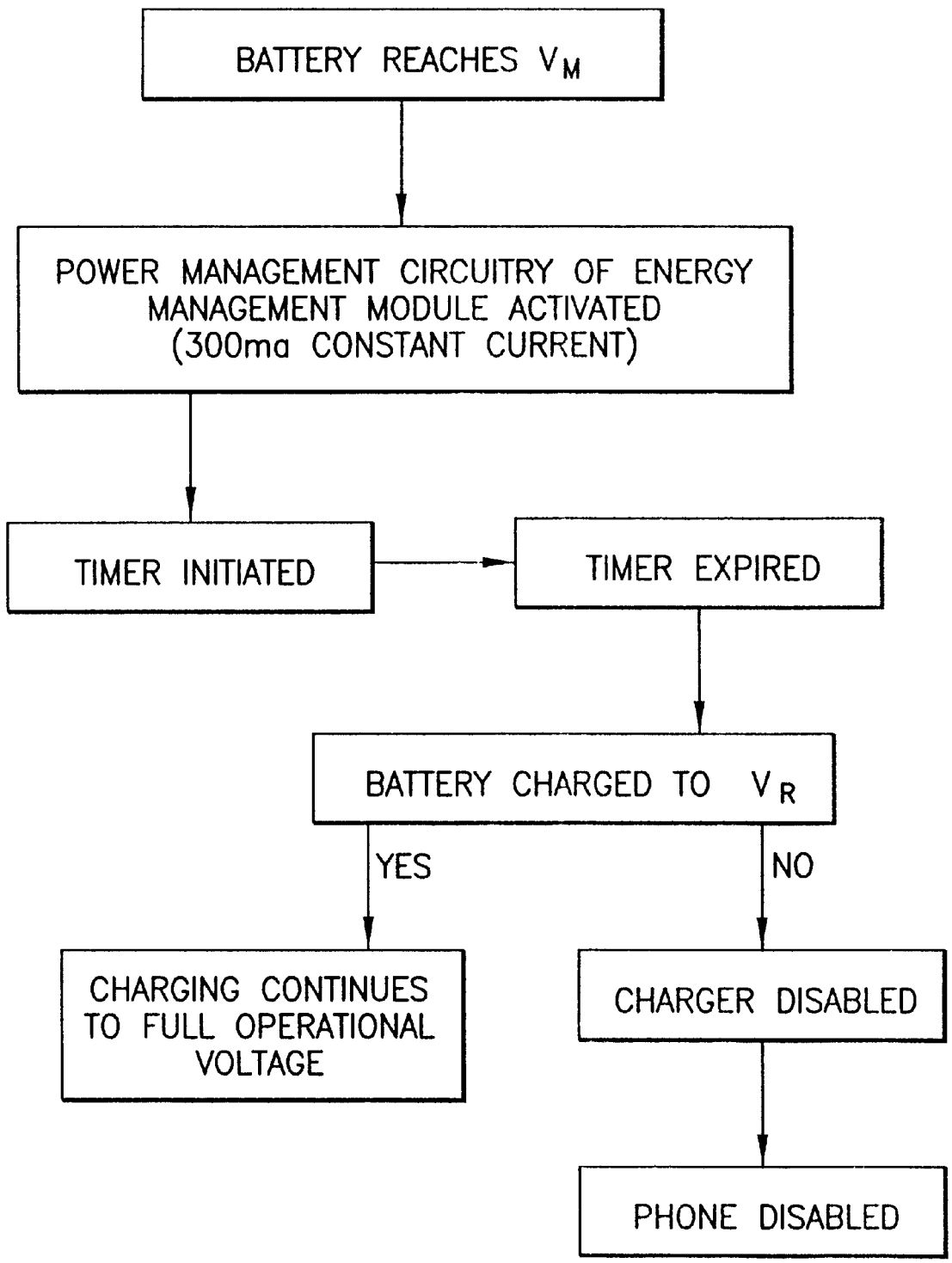
FIG. 4 is a continuation of the chart of the operating steps of this invention.

The start-up charging circuit can be implemented in a variety of configurations. For illustration, a preferred embodiment of a suitable circuit is shown in FIG. 4. The start-up module 6 is powered by the voltage ($V_c$) generated by the charger 4. This is necessary, as this module is only used when $V_{BAT}<V_R$. The sensor module consists of a negative temperature coefficient resistor (RNTC) 8 and a conventional resistor 9 connected as a voltage divider across $V_{BAT}$. A pair of comparators 10 and 11 are connected to RNTC 8 and resistor 9 respectively to analyze the signals from these components. The comparators, in this instance, should be a differential amplifier with hysteresis connected as shown.

RNTC 8 is operationally associated with the battery 3 to vary its resistance value in response to battery temperature. A voltage across RNTC 8 will signal the comparator 10 which will compare this temperature signal to a value indicative of a temperature limit. Typically this limit is set relative to approximately 40° C. as charging at temperatures above 40° C. may damage the battery. It is advantageous to determine if the battery pack is dysfunctional in a way that could create excessive currents in the charging circuit, for example, if the battery pack is an assembly of multiple cells and one or more of cells is dead. The malfunctioning condition will be reflected in an increased battery temperature and therefore, in the signal generated by RNTC 8.

Resistor 9 is shown connected in manner which will indicate the presence of battery pack 3. By comparing the signal from resistor 9, the operational presence of the battery can be sensed.

Controller 12 senses the initiation of a charging current and enables the comparators 10 and 11. The comparators are connected within the start-up module to shut down the charging function in the event that either an excessive battery temperature or an unconnected battery is sensed.

The first phase of the start-up charging cycle, 100 ma, as shown in the graph of FIG. 2, is enabled, when a functional battery is sensed by comparator 11, responsive to the signal from resistor 9. Start-up charging therefore, will be blocked without an appropriate indication at comparator 11. The start up charging current is controlled by start amplifier 13 which in turn enables transistor switch 14.

Figure 3:
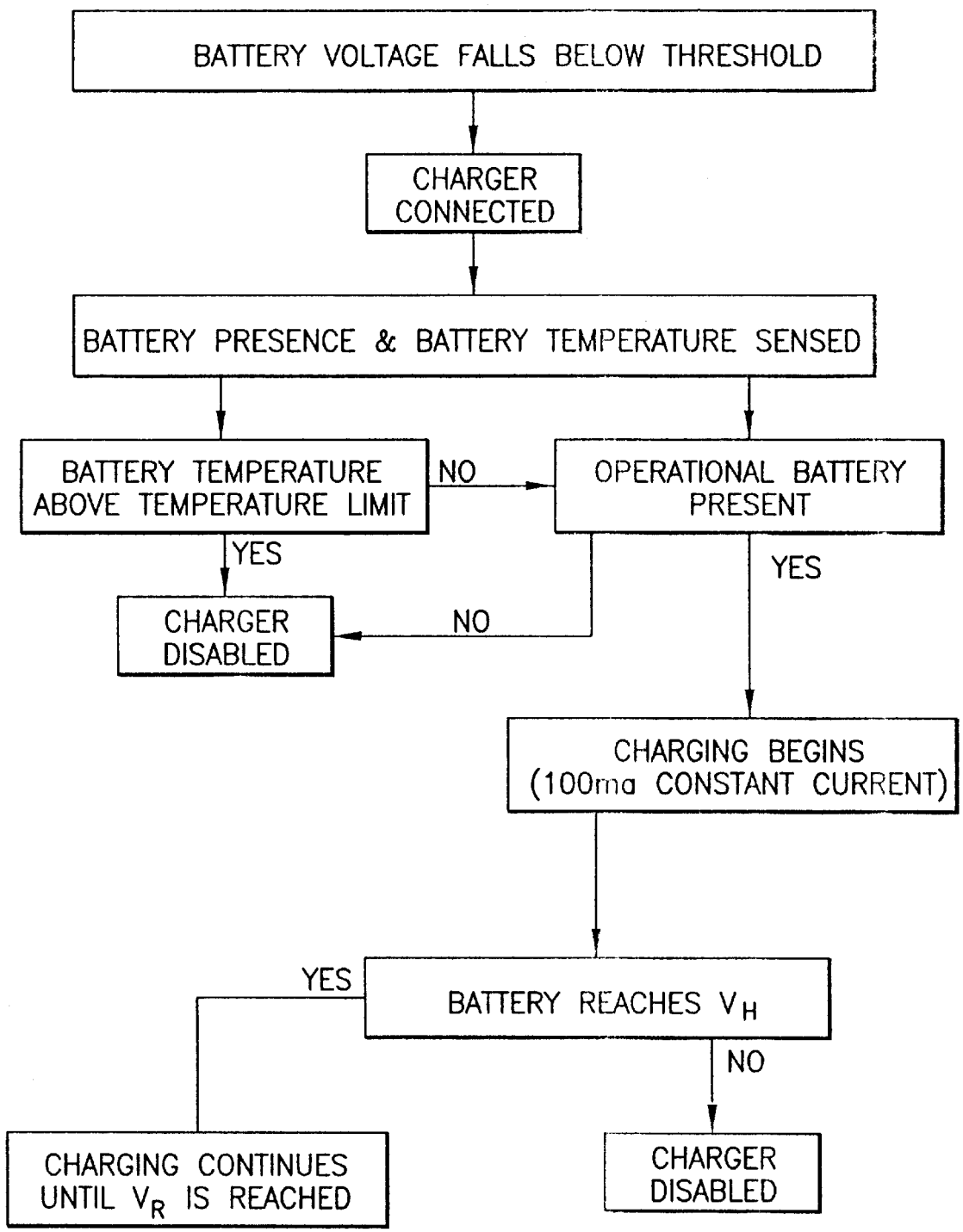
FIG. 3 is a chart of the operating steps of this invention.

The operation of the charging system of this invention is shown in FIGS. 3 and 4 and is divided into two phases. Since the operation of this invention occurs only when the battery voltage is depleted below the threshold of operation of the MCU 2, this is assumed in the following description.

When the cellular phone is plugged into the charger, a charging current is initiated. The rising voltage of the charger is sensed and enables the start-up module 6. A signal is generated by the temperature sensitive resistor 8 relative to the temperature of the battery. This signal is compared to a predetermined limit set in the comparator 10. If the battery temperature exceeds the limit, then charging will be aborted. A signal indicative of the proper connection of battery pack 3 is generated at resistor 9 and if the signal complies with the predetermined criteria of comparator 11, Phase 1 of the start-up charging cycle is initiated. In phase 1, the charger current is limited to 100 ma.

Providing a voltage is reached indicative of normal charging, the start-up module 6, passes control to the energy management module 5, and phase 2 of the start-up charging cycle will begin. In phase 2, the charging current is limited to 300 ma.

The charging cycle is monitored by a timer which is enabled at the start of phase 2. After the expiration of a predetermined period, the battery voltage is checked. At this point the battery voltage should be sufficient to power the MCU 2 ($V_R$). If has not charged to $V_R$, then the charger is shut down. Once $V_R$ is attained, during this period, the MCU will assume control of the charging in a conventional manner.

I claim:

1. A battery charging system for a cellular phone, said cellular phone having a controller constructed to operate the battery charging system when enabled, said controller having a predetermined minimum operating voltage threshold, said charging system comprising:
    a charger for connection to the cellular phone to provide a charging current to the battery when the battery is depleted;
    an energy management module connected to control a start-up operation of the charger when the battery voltage falls below said operational threshold of the controller;
    a start-up charging module connected within the energy management module to control an initial phase of the start-up operation of the charger, said start-up charging module further comprising:
        a first sensor connected in operative association with the battery to sense the temperature of the battery and generate a signal relative thereto;
        a first comparator connected to receive the signal from the first sensor and compare said signal to a preset temperature limit;
    wherein the start-up module enables the supply of a limited current to the battery when the temperature of the battery is below the preset limit and disables the charger when the temperature of the battery exceeds said preset limit.

2. A battery charging system for a cellular phone, said cellular phone having a controller constructed to operate the battery charging system when enabled, said controller having a predetermined minimum operating voltage threshold, said charging system as described in claim 1 further comprising:
    a second sensor connected in operative association with the battery to sense the presence thereof and generate a signal indicative of said presence; and
    a second comparator connected to receive the signal from the second sensor and compare said signal to preset conditions;
    wherein the start-up module enables the supply of a limited current to the battery, when said preset conditions are present, and disables the charger, when said preset conditions are not met.

3. A battery charging system for a cellular phone, said cellular phone having a controller constructed to operate the battery charging system when enabled, said controller having a predetermined minimum operating voltage threshold, said charging system as described in claim 1 wherein the start-up module is powered by the voltage output of the charger.

4. A battery charging system for a cellular phone, said cellular phone having a controller constructed to operate the battery charging system when enabled, said controller having a predetermined minimum operating voltage threshold, said charging system, as described in claim 1, wherein said start-up operation is in two phases including an initial phase in which the charging current is limited to an initial value and a second phase wherein said charging current is limited to a second larger value, and further wherein the initial phase is controlled by the start-up module and the second phase is controlled by the energy management module and wherein the second phase is initiated upon the battery voltage attaining a first predetermined value.

5. A battery charging system for a cellular phone, said cellular phone having a controller constructed to operate the battery charging system when enabled, said controller having a predetermined minimum operating voltage threshold, said charging system as described in claim 4 wherein said energy management module further comprises a timer which is enabled with the initiation of the second phase of said start-up operation begins, and wherein said energy management module shuts down the charging cycle if, upon the expiration of a predetermined period of the timer, a preset battery voltage is not attained.

6. In a battery charging system for a cellular telephone having a charger, a main controller for operating said charger, said main controller having a predetermined minimum operating voltage threshold, and an energy management module for operating the charger when said operating voltage threshold is not available, a method for replenishing the voltage level when the battery voltage falls below said threshold, comprising the steps of:

connecting the cellular telephone to the charger;

sensing the voltage level of the battery and comparing said voltage to said operational voltage threshold;

enabling the energy management module when said battery voltage level is below said voltage threshold, wherein said module initiates a start-up charging cycle with a limited charging current;

sensing the temperature of the battery and generating a signal relative thereto;

comparing the temperature signal with a predetermined maximum value;

enabling the supply of a limited current to the battery when the temperature of the battery is below the preset limit; and disabling the charger if said temperature signal exceeds the predetermined maximum.

7. In a battery charging system for a cellular telephone having a charger, a main controller for operating said charger, said main controller having a predetermined minimum operating voltage threshold, and an energy management module for operating the charger when said operating voltage threshold is not available, a method for replenishing the voltage level when the battery voltage falls below said threshold, as described in claim 6, further comprising the steps of:

sensing the presence of the battery and generating a signal relative thereto;

comparing the presence signal to a predetermined value;

enabling the supply of a limited current to the battery when said preset conditions are present; and disabling the charger if the predetermined condition is not met.

8. In a battery charging system for a cellular telephone having a charger, a main controller for operating said charger, said main controller having a predetermined minimum operating voltage threshold, and an energy management module for operating the charger when said operating voltage threshold is not available, a method for replenishing the voltage level when the battery voltage falls below said threshold, as described in claim 6, further comprising the step of powering the sensing and comparing steps from the output of the charger.

9. In a battery charging system for a cellular telephone having a charger, a main controller for operating said charger, said main controller having a predetermined minimum operating voltage threshold, and an energy management module for operating the charger when said operating voltage threshold is not available, a method for replenishing the voltage level when the battery voltage falls below said threshold, as described in claim 6, wherein said start-up operation is in two phases including an initial phase in which the charging current is limited to an initial value and a second phase wherein said charging current is limited to a second larger value, and further wherein the initial phase is controlled by the start-up module and the second phase is controlled by the energy management module and wherein the second phase is initiated upon the battery voltage attaining a first predetermined value.

10. In a battery charging system for a cellular telephone having a charger, a main controller for operating said charger, said main controller having a predetermined minimum operating voltage threshold, and an energy management module for operating the charger when said operating voltage threshold is not available, a method for replenishing the voltage level when the battery voltage falls below said threshold, as described in claim 9, further comprising the steps of:

setting a predetermined target charge for the start-up operation's second phase;

timing the second phase of start-up operation; and setting a time limit for reaching the target charge in the second phase; and disabling the start-up operations in the event that the target charge is not attained during the preset time limit.

* * * * *